July 27, 1926.  1,593,576
W. T. HUNT
BRAKE FOR MOTOR VEHICLES
Filed April 5, 1924   2 Sheets-Sheet 1
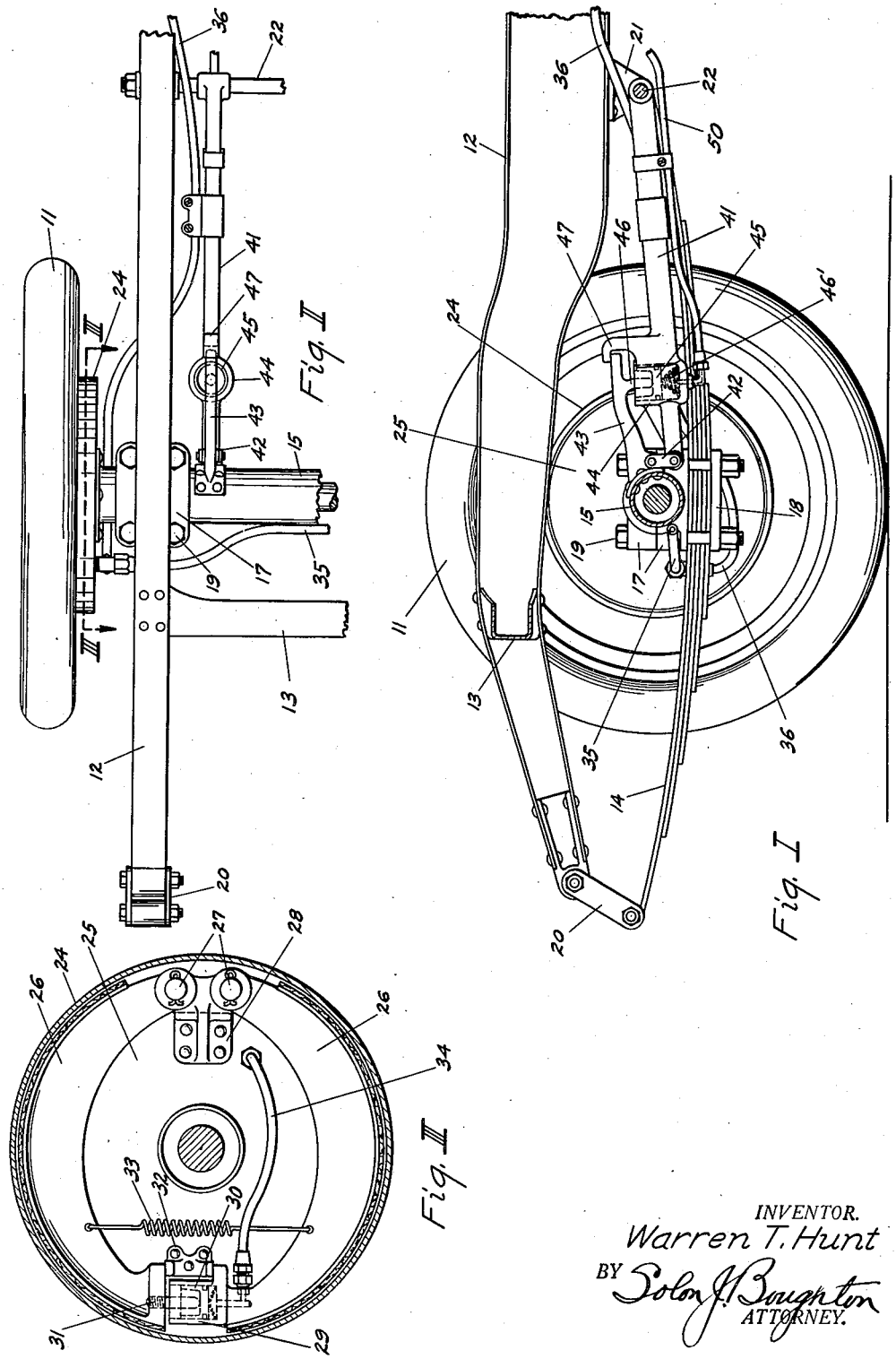
INVENTOR.
Warren T. Hunt
BY Solon J. Boughton
ATTORNEY.

July 27, 1926.
W. T. HUNT
1,593,576
BRAKE FOR MOTOR VEHICLES
Filed April 5, 1924        2 Sheets-Sheet 2
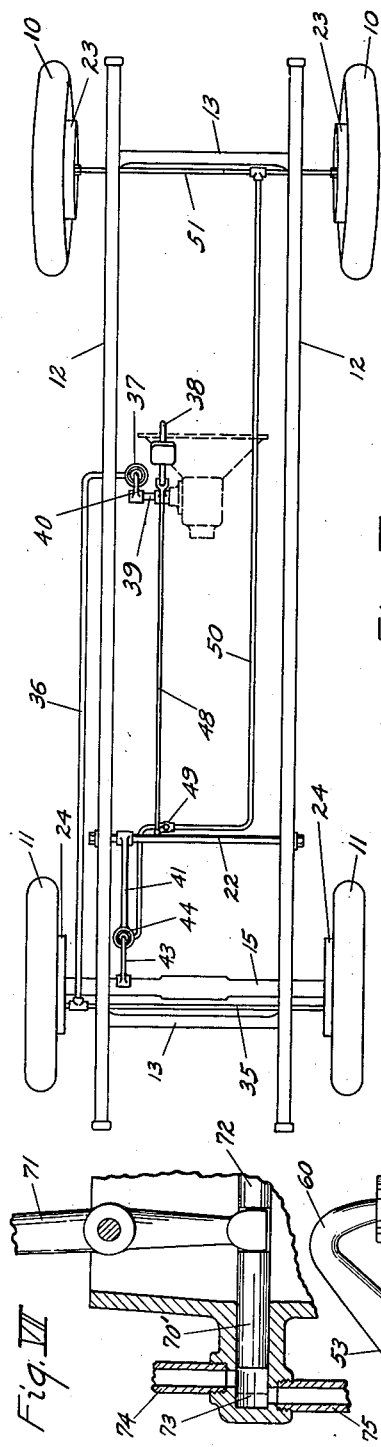
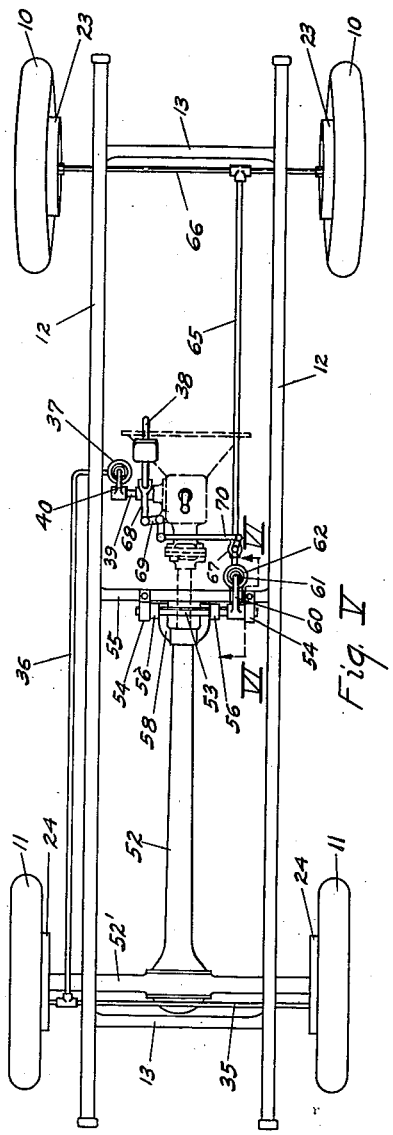
INVENTOR.
Warren T. Hunt
BY Solon J. Boughton
ATTORNEY.

Patented July 27, 1926.

1,593,576

UNITED STATES PATENT OFFICE.

WARREN T. HUNT, OF TOLEDO, OHIO, ASSIGNOR TO THE WILLYS-OVERLAND COMPANY, OF TOLEDO, OHIO, A CORPORATION OF OHIO.

BRAKE FOR MOTOR VEHICLES.

Application filed April 5, 1924. Serial No. 704,426.

This invention relates to brakes for motor vehicles, and has for one object to provide a braking system in which the application of the brakes on the wheels of one axle is effected through mechanism constructed so as to be operated by the torque set up in the other axle, or parts attached thereto, when the brakes are applied to the wheels of the latter axle.

Another object of the invention is to provide a fluid pressure brake arrangement for the wheels on one axle of a motor vehicle, adapted to be actuated by the torque set up by the application of the brakes on the wheels of the other axle.

Another object of the invention is to provide fluid pressure brakes for the front and rear wheels of the vehicle, in which application of the rear wheel brakes is effected by operation of the brake pedal, while the application of the front brakes is effected by means actuated as a result of the brake torque of the rear axle housing or some other relatively movable part of the vehicle.

Another object of the invention is to provide an improved mechanism between the rear axle housing and the frame of the vehicle for resisting the normal driving torque reaction, and so constructed as to effect application of a fluid pressure brake for the vehicle when relatively movable parts of said mechanism are actuated as a result of the application of the rear wheel brakes.

Another object of the invention is to provide fluid pressure brakes for the front and rear wheels of the vehicle, the former being actuated as a result of the braking torque set up upon the application of the rear wheel brakes, and the latter being manually or pedal controlled, together with means for preventing the unintentional application of the forward brakes when the vehicle is moving in a backward direction.

Another object of the invention is to provide mechanism for resisting the normal driving torque reaction of the rear axle housing, in combination with a rear spring drive in which the springs are relieved of the driving torque strains, but function as a straight-ahead drive between the axle and the frame, the turning effort of the housing being taken by the torque resisting mechanism.

Another object of the invention is to provide a fluid pressure brake system for the vehicle, arranged to be actuated as a result of the torque of a relatively movable part produced by the application of another brake, said fluid pressure system being rendered ineffective through the operation of the transmission mechanism when the operating member therefor is moved to reverse position, as when it is desired to back the vehicle.

Another object of the invention is to provide a front wheel brake system adapted to be actuated as a result of a relative movement between the frame of the vehicle and a torque tube connected thereto, upon application of a set of brakes connected with the rear wheels of the vehicle.

Other objects will appear from the description to follow, covering certain embodiments of the invention, which, for the purposes of the present application, I have illustrated in the accompanying drawings, in which:

Figure I is a longitudinal, sectional elevation through the rear portion of the running gear of the vehicle, illustrating in somewhat diagrammatic form, certain features of the invention.

Fig. II is a plan view of the construction shown in Fig. I.

Fig. III is a sectional elevation through one of the brake drums, taken on line III—III of Fig. II.

Fig. IV is a diagrammatic plan of a vehicle chassis including a brake system embodying the principles of the brake disclosed in Figs. I and II, and illustrating additionally, a fluid pressure system for the front wheel brakes and the pedal control for effecting application of the rear wheel brakes, and for opening a valve which normally prevents operation of the front wheel brakes.

Fig. V is a diagrammatic plan illustrating a modified fluid pressure brake system in which the rear brakes are pedal controlled and the front brakes controlled by a torque tube surrounding the propeller shaft.

Fig. VI is an enlarged detail sectional elevation taken on line VI—VI of Fig. V, and Fig. VII is a fragmentary, sectional elevation taken through a portion of the transmission casing and illustrating a valve controlled by the transmission operating lever for rendering the front brakes ineffective when said lever is moved to reverse position.

In the drawings, I have shown a vehicle chassis having the usual front and rear wheels 10 and 11, the side and cross frame members 12 and 13 respectively, the rear springs 14, and the rear axle housing 15. The springs are secured to the housing by the bearing sections 17 and the plate 18, said parts being connected together by the bolts 19 as shown in Figs. I and II, but the connection being preferably such as to permit a slight rotary motion of the housing in the bearing blocks 17, or if desired, the flexure of the spring may be utilized to permit the rotary motion of the housing, the latter then being rigidly secured to the spring. The outer ends of the spring are connected to the frame members in the usual manner by the links 20, while the inner ends are connected thereto by the brackets 21 carrying a cross tie-rod 22.

On the outer ends of the front and rear axles and within the brake drums 23 and 24 of the front and rear wheels, is disposed any suitable type of brake mechanism, such as that shown in Fig. III. In this construction, the axle is provided with a disc 25 closing the end of the drum and forming a support for the internally disposed brake including the shoes 26 pivoted at 27 to a bracket 28 rigidly secured upon the disc as shown in Fig. III. One shoe at its free end, carries a small cylinder 29 in which is disposed a piston 30 having an adjustable operating stem 31 threadedly connected with the free end of the other shoe, as shown in Fig. III. A bracket 32 secured to the inner face of the disc 25 forms a stop to limit the inward movement of the shoes, one toward another, the shoes being normally held out of contact with the drum by a spring 33.

Fluid for operating the rear brakes is supplied to the cylinder 29 through a tube 34 located within the brake drum which connects outside of the drum with a tube 35 extending to the drum on the opposite end of the axle, and also with a forwardly extending flexible tube 36 connected with any suitable fluid supply source (not shown), and with a suitable pressure producing means such as the cylinder and piston indicated at 37 in Fig. IV, the piston being operated by the pedal lever 38 through rotation of the shaft 39 and the crank arm 40.

The mechanism just described, is shown more or less conventionally, and may be varied to suit different conditions and to any desired extent, in providing means to effect application of the rear wheel brakes, while in the broader aspects of the invention, it is not even essential that fluid operated brakes be employed at all.

The application of the front wheel brakes and the mechanism for controlling the same through the braking torque of the rear axle housing, will now be described.

The construction shown in Figs. I, II and IV, embodies a combined driving torque resisting and brake operating mechanism between the rear axle housing 15 and the frame of the vehicle, which includes a rod 41 having its front end connected with the cross tie-rod 22 and its rear end terminating near the housing 15 and provided with vertically disposed links 42 connecting it with a forwardly extending arm 43 secured upon the housing 15 adjacent one of the side frame members, as shown in Fig. II. The rod carries a cylinder 44 near its rear end, in which is disposed a piston 45 adapted to be actuated by a depending finger 46 on the arm 43, which loosely engages the piston, as shown in Fig. I. A spring 46' is disposed within the cylinder to yieldingly hold the piston in contact with said depending finger. The rod carries an upstanding hook-like portion 47 adapted to engage the top face of the outer end of the arm 43 to hold the latter against undue upward movement during normal service conditions, whereby to resist the turning of the rear axle housing in a counter-clockwise direction. The mechanism just described, is adapted to effect application of the front wheel brakes, but only at the desired time, following or practically simultaneous with the application of the rear wheel brakes.

It will be understood that normally, when the vehicle is traveling over the road, there is a tendency for the rear axle housing to turn in a counter-clockwise direction, as viewed in Fig. I, due to driving torque reaction. Consequently, there is a tendency to lift the arm 43, and through it, the rear end of the rod 41, the links 42 also tending to raise the rod but permitting longitudinal movement of the latter when the distance between the rear axle and the rod 22 varies slightly on account of spring movements. The forward end of the rod is preferably adapted to turn about an axis coincident with the pivotal axis of the front ends of the springs, so as to avoid undue strains and stresses of the torque resisting mechanism. Connection of the rod with the frame at a point either considerably ahead, or in rear of the front end of the spring, would result in undue distortion of one or the other of the members, for the reason that when the wheel is jumped up by an obstruction in the road, the spring would tend to direct the movement of the axle in one arc, while the rod would act to limit its movement to another arc. With the rod and spring connected to the frame to swing about the same pivotal axis, and with the free movement of the rod permitted by the link connections 42, there is provided a flexible driving and torque resisting mechanism of simple construction, in which the one acts to reduce the strains and stresses in the other, and in which one serves as a means for effecting the application of the front wheel brakes. Any upward movement of the rod 41 and arm 43, will have little appreciable effect on the position of the piston 45 in the cylinder 44. However, when the rear brakes are applied, the axle housing 15 tends to turn in a clockwise direction, as viewed in Fig. I, and consequently, the arm 43 is moved downwardly to depress the piston 45, whereby to compress the fluid in the piping to effect application of the front wheel brakes. When the arm 43 is moved downwardly, the rod 41 will, of course, be moved downwardly by the links 42, but the piston operating finger 46 will move through a greater arc than the links, since it is further from the pivotal axis of the arm. Consequently, the amount of piston movement will be equal to the difference in the movement of the finger 46 and the links 42. This difference may be varied, as desired, by any well-known means of adjustment (not shown), as by making the operating finger adjustable on the arm 43.

When the pedal lever 38 is depressed to operate the rear wheel brakes, the rod 48 acts to open a valve 49 in the fluid supply pipe 50 leading from the cylinder 44 to the transverse pipe 51, connected with the brake operating cylinders 29 located within the front brake drums 23. Return of the pedal lever to normal position, will automatically close the valve 49 and prevent accidental operation of the front wheel brakes.

In the modification shown in Fig. V, the rear wheel brake mechanism is preferably the same as that shown in Figs. I to IV inclusive, but the actuating means for the front wheel brakes is slightly different, being controlled by the torque tube 52 extending from and actuated by the rear axle housing 52'. The torque tube is forked at its front end and suspended from a horizontal pivot bolt 53 carried by brackets 54 on the cross-bar 55, the connection being through the depending arms 56, rigid on the pivot bolt and carrying pins 57 extending through the arms 58 of the fork. The arms 56 are provided with downwardly extending projections 59 adapted to normally engage the cross-bar 55 so as to complete the drive to the frame.

The horizontal pivot bolt 53 is provided with an arm or bent lever 60, the forward end of which freely engages a piston 61 in a cylinder 62 carried by a bracket 63 supported by the cross bar, as shown in Fig. VI. The piston is yieldably held in engagement with the arm 60 by a spring 64 in the bottom of the cylinder. Extending from the cylinder 62 is a conduit 65 leading to the transverse conduit 66 for supplying fluid to the brake cylinders 29 in the front brake drums 23. Normally, in driving ahead, the extensions 59 of the arms 56 are held in engagement with the cross-bar 55 by the torque tube 52, at which time the piston operating lever 60 is held at inoperative position. However, when the rear wheel brakes are applied, the rear axle housing 52' will tend to rotate in a reverse direction from that in which it tended to rotate when acting as a straight-ahead drive. When a reduction in the speed of the rear wheels is produced by the application of the brakes therefor, the momentum of the machine will act to carry the frame and its super-structure ahead, the spring suspension being of a design capable of affording the desired longitudinal movement of the frame relative to torque tube and rear axle housing. Consequently, the horizontal pivot pin 53 acting as a support for the front end of the torque tube, will move forwardly in an arc about the axis of the pivot pin 57, thus depressing the operating member 60 and the piston 61 to effect application of the front wheel brakes immediately following the application of the rear wheel brakes.

In order to prevent accidental application of the front wheel brakes in the modified form of the invention shown in Fig. V, the conduit 65 is normally closed by a valve 67 which is opened when the pedal lever 38 is depressed, through operation of a link connection 68, bell-crank 69 and rod 70, as shown in Fig. V.

In the different construction shown in Figs. IV and V, the front wheel brakes are put into condition for operation by the actuation of the pedal lever, but if desired, the construction may be such as to effect this result independently of the operation of the pedal lever.

In Fig. VII is shown a modification which is applicable to the braking arrangement shown in Fig. IV, as well as to that shown in Fig. V. With this modified arrangement it is intended to prevent operation of the front wheel brakes when backing the vehicle, by closing a valve 70' when moving the transmission operating lever 71 to reverse position. This valve preferably comprises an extension of one of the sliding rods 72 of the gear shift mechanism, and the valve is movable in a chamber 73 to cut off communication between the conduits 74 and 75 which extend between the cylinders 44 or 62, as the case may be, and the front wheel brakes of the vehicle.

While I have shown in considerable detail, certain specific embodiments of my invention, it is to be understood that this showing and description are illustrative only, and that I do not regard the invention as limited to the details of construction illustrated and described, except in so far as I have included such limitations within the terms of the following claims, in which it is my intention to claim all novelty inherent in the invention broadly, as well as specifically.

I claim as my invention:

1. In combination, a motor vehicle having front and rear wheels, a set of brakes for each pair of wheels, actuating means for one set of brakes, fluid pressure controlling means for actuating the other set of brakes, and means rendered active by the application of the first-mentioned set of brakes, adapted to effect operation of said fluid pressure controlling means to apply the other set of brakes.

2. In combination, a motor vehicle having front and rear wheels, a set of brakes for each pair of wheels, actuating means for one set of brakes, fluid pressure controlling means for actuating the other set of brakes, means rendered active by the application of the first-mentioned set of brakes, adapted to effect operation of said fluid pressure controlling means to apply the other set of brakes, and means under the control of the first-mentioned actuating means, adapted to prevent accidental operation of the second-mentioned set of brakes.

3. In combination, a motor vehicle having front and rear wheels, a set of brakes for each pair of wheels, actuating means for one set of brakes, fluid pressure controlling means for actuating the other set of brakes, and operating means for said fluid pressure controlling means adapted to be actuated as a result of the torque of a relatively movable part of the vehicle, produced by the application of the first-mentioned set of brakes.

4. In combination, a motor vehicle having front and rear wheels and axles, including a housing for said rear axle, a set of brakes for each pair of wheels, actuating means for the rear set of brakes, fluid pressure controlling means for effecting application of the front wheel brakes, and means adapted to be moved by the torque of the rear axle housing upon application of the rear wheel brakes, said means being adapted to effect operation of said fluid pressure controlling means, whereby to apply the front wheel brakes.

5. In combination, a motor vehicle having front and rear wheels and axles, including a housing for said rear axle, a set of brakes for each pair of wheels, actuating means for the rear set of brakes, means for operating the front set of brakes, and means projecting from said housing and adapted to actuate said front brake operating means upon rotational movement of the housing due to the application of the rear wheel brakes.

6. In combination, a motor vehicle having front and rear wheels and axles, including a housing for said rear axle, a set of brakes, for each pair of wheels, actuating means for the rear set of brakes, means for operating the front set of brakes, means projecting from said housing and adapted to actuate said front brake operating means upon rotational movement of the housing due to the application of the rear wheel brakes, and means for counter acting the tendency of the housing to rotate in the opposite direction in response to driving torque reaction.

7. In combination, a motor vehicle having front and rear wheels and axles, including a housing for said rear axle, said housing being free to turn slightly, a set of brakes for each pair of wheels, actuating means for the rear set of brakes, means for operating the front set of brakes, and means projecting from said housing and adapted to actuate said front brake operating means upon rotational movement of the housing due to the application of the rear wheel brakes.

8. In combination, a motor vehicle having front and rear wheels and axles, including a housing for said rear axle, a set of brakes for each pair of wheels, actuating means for the rear set of brakes, fluid pressure controlling means for the front set of brakes, means projecting from said housing and adapted to effect operation of said fluid pressure controlling means, whereby to apply the front wheel brakes, and means adapted to prevent accidental operation of the front wheel brakes, said means being rendered ineffective by the operating means for the rear wheel brakes upon application of the latter.

9. In combination, a motor vehicle having front and rear wheels and axles, including a housing for the rear axle, a set of brakes for each pair of wheels, actuating means for the rear set of brakes, separate actuating means for the front set of brakes, and means connected with said housing between the rear wheel brake drums, adapted to be actuated by the braking torque of the housing to effect operation of the actuating means for the front wheel brakes.

10. In combination, a motor vehicle having front and rear wheels and axles, including a housing for the rear axle, a set of brakes for each pair of wheels, actuating means for the rear set of brakes, separate actuating means for the front set of brakes, means connected with said housing between the rear brake drums adapted to be actuated by the braking torque of the housing to effect operation of the actuating means of the front wheel brakes, and means normally preventing application of the front wheel brakes by rendering said torque actuated means ineffective.

11. In combination, a motor vehicle having front and rear wheels and axles, including a housing for the rear axle, a set of brakes for each pair of wheels, actuating means for the rear set of brakes, fluid pressure control means for actuating the front set of brakes, including a cylinder and a piston therein, and a member projecting from said housing and operatively connected with said piston, said member being adapted to be moved to operative position as a result of the torque of the housing produced upon application of the rear wheel brakes.

12. In combination, a motor vehicle having front and rear wheels and axles, including a housing for the rear axle, a set of brakes for each pair of wheels, actuating means for the rear set of brakes, fluid pressure control means for actuating the front set of brakes, including a cylinder and a piston therein, a member projecting from said housing and operatively connected with said piston, said member being adapted to be moved to operative position as a result of the torque of the housing produced upon application of the rear wheel brakes, and means controlled by the rear brake actuating means for preventing accidental application of the front wheel brakes.

13. In combination, a motor vehicle including a frame and front and rear wheels and axles, together with a housing for the latter, springs connected with the housing and with the frame and forming a drive for the vehicle, and a torque resisting mechanism for the housing including an arm projecting therefrom and a rod having its front end connected with the frame and its rear end pivotally connected with said arm.

14. In combination, a motor vehicle including a frame and front and rear wheels and axles, together with a housing for the latter, springs connected with the housing and with the frame, a torque resisting mechanism including an arm projecting from the housing, a rod having its front end connected with the frame, a link connecting its rear end with the arm, and means upon the rod for limiting the movement of the arm in one direction.

15. In combination, a motor vehicle including a frame and front and rear wheels and axles, together with a housing for the latter, springs connected with the housing and with the frame, a torque resisting mechanism for the housing including an arm projecting therefrom and a rod having its front end connected with the frame and its rear end pivotally connected with said arm, and means upon the rod for limiting the movement of the arm in one direction.

16. In combination, a motor vehicle including a frame and front and rear wheels and axles, together with a housing for the latter, brakes for the front wheels, a torque arm connected with said housing, a rod having its front end connected with the frame and its rear end pivotally connected with said arm, and means for actuating said front wheel brakes adapted to be operated by movement of the arm.

17. In combination, a motor vehicle including a frame and front and rear wheels and axles, together with a housing for the latter, separate sets of brakes for the front and rear wheels, a torque arm connected with the housing, a rod pivotally connected with the frame and with the arm, a cylinder carried by the rod, a piston within the cylinder adapted to be actuated by the arm, means connecting the cylinder with the front wheel brakes to effect application of the latter, and means for effecting application of the rear wheel brakes.

18. In combination, a motor vehicle including a frame and front and rear wheels and axles, together with a housing for the latter, springs connected with the housing and with the frame and forming a drive for the vehicle, separate sets of brakes for the front and rear wheels, means for effecting application of the front wheel brakes, a torque arm connected with the rear axle housing and adapted to operate said means, and means for effecting application of the rear wheel brakes.

19. In combination, a motor vehicle including a frame and front and rear wheels and axles, together with a housing for the latter, an arm extending from the housing, a rod having its front end pivotally connected with the frame, links connecting the rear end of the rod with said arm, means carried by the rod for limiting the movement of the arm in one direction, a cylinder upon the rod, a piston in the cylinder adapted to be actuated by said arm, means connecting the cylinder with the front wheel brakes, whereby to effect application of the same, and separate means for actuating the rear wheel brakes.

20. In combination, a motor vehicle including a frame and front and rear wheels and axles, together with a housing for the latter, separate sets of brakes for the front and rear wheels, an arm extending from the housing, a rod having its front end connected with the frame and its rear end pivotally connected with the arm, means upon the rod for limiting the movement of the arm in one direction, a cylinder, a piston within the cylinder adapted to be actuated by the arm, fluid pressure controlling means connecting the cylinder with the front wheel brakes, whereby to effect application of the same, and separate means for effecting application of the rear wheel brakes.

21. In combination, a motor vehicle including a frame and front and rear wheels and axles, together with a housing for the latter, separate sets of brakes for the front and rear wheels, a torque controlled member extending forwardly from the rear axle housing and pivotally connected with the frame, means controlled by said member for effecting application of the front wheel brakes, and separate means for actuating the rear wheel brakes.

22. In combination, a motor vehicle including a frame and front and rear wheels and axles, together with a housing for the latter, separate sets of brake mechanisms for the front and rear wheels, a torque controlled member having its rear end connected with the housing, a horizontally disposed pivotal support connecting the front end of said member with the frame, operating means connected with said pivotal support for effecting application of said front wheel brake mechanism, and separate means for applying the rear wheel brakes.

23. In combination, a motor vehicle including a frame and front and rear wheels and axles, together with a housing for the latter, separate sets of brakes for the front and rear wheels, a torque controlled member having its rear end connected with the housing and its front end yieldably connected with the frame, a fluid pressure cylinder connected with the front wheel brakes, a piston within the cylinder, means adapted to be actuated by said torque controlled member for operating said piston, whereby to effect application of the front wheel brakes, and separate means for actuating the rear wheel brakes.

24. In combination, a motor vehicle including a frame and front and rear wheels and axles, together with a housing for the latter, separate sets of brakes for the front and rear wheels, a torque controlled member having its rear end connected with the housing, a pivotal member connecting the front end of the torque controlled member with the frame, a fluid pressure cylinder connected with the front wheel brakes, a piston within the cylinder, means connected with said pivotal member for actuating the piston and separate means for actuating the rear wheel brakes.

In testimony whereof, I affix my signature.

WARREN T. HUNT.